(12) United States Patent
Koike et al.

(10) Patent No.: US 6,621,328 B2
(45) Date of Patent: Sep. 16, 2003

(54) SEMICONDUCTOR DEVICE

(75) Inventors: Yoshihiko Koike, Kawasaki (JP); Shuji Yoshida, Kawasaki (JP); Tetsuya Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/096,426

(22) Filed: Mar. 13, 2002

(65) Prior Publication Data

US 2003/0038673 A1 Feb. 27, 2003

(30) Foreign Application Priority Data

Aug. 24, 2001 (JP) ........................................ 2001-253968

(51) Int. Cl.$^7$ ................................................ G05F 1/10
(52) U.S. Cl. ........................................ 327/540; 327/143
(58) Field of Search .................... 326/80, 81; 327/142, 327/143, 333, 540

(56) References Cited

U.S. PATENT DOCUMENTS 5,936,443 A  * 8/1999 Yasuda et al. ............... 327/143
6,078,201 A  * 6/2000 Crotty ......................... 327/143
2002/0011883 A1 * 1/2002 Yamazaki et al. .......... 327/143

FOREIGN PATENT DOCUMENTS

JP    2001-144600    5/2001

\* cited by examiner

Primary Examiner—Jeffrey Zweizig
(74) Attorney, Agent, or Firm—Arent Fox Kintner Plotkin & Kahn, PLLC

(57) ABSTRACT

A semiconductor device that prevents malfunction in an external circuit by preventing an indefinite signal from being output at the time of power being applied. A processing circuit is supplied with an internal power supply voltage from an internal power supply voltage generating circuit and performs a predetermined process. An output circuit outputs the result of processing by the processing circuit. When the supply of an external power supply voltage is begun, a control circuit exercises control so that output from the output circuit will be kept in a predetermined state. A supply circuit supplies an external power supply voltage to the control circuit.

22 Claims, 14 Drawing Sheets

SEMICONDUCTOR DEVICE

BACKGROUND OF THE INVENTION (1) Field of the Invention

This invention relates to a semiconductor device and, more particularly, to a semiconductor device which operates at an external power supply voltage and an internal power supply voltage being different from the external power supply voltage in voltage.

(2) Description of the Related Art

To increase processing speed and reduce power consumption, in recent years circuits on many semiconductor devices, such as central processing units (CPUs), have been operated at voltages (1.8–3.3V, for example) lower than 5V which is a power supply voltage for conventional interfaces, such as transistor—transistor logic (TTL) circuits.

In not a few systems, however, conventional interfaces, such as TTL circuits, are used as external circuits to reduce the cost. Therefore, in these systems, an internal circuit, being a CPU, is operated at a low voltage, but a power supply voltage of 5V is used for external circuits.

As a result, usually a power supply voltage of 5V is used for an entire system and a step-down circuit is included in the system. This step-down circuit generates a lower voltage and supplies it to semiconductor devices, such as a CPU, as power supply voltage.

FIG. 13 is a view showing an example of such conventional semiconductor devices.

As shown in FIG. 13, a conventional semiconductor device 1 comprises a step-down circuit 2, internal circuit 3, and level converter 4.

The step-down circuit 2 drops power supply voltage Vcc2 (5V, for example) supplied from the outside to generate Vcc1 (3.3V, for example) and supplies it to the internal circuit 3 and level converter 4.

The internal circuit 3 is, for example, a CPU and performs various operations with Vcc1 supplied from the step-down circuit 2 as power supply voltage.

The level converter 4 converts an internal signal (signal at the Vcc1 level) output from the internal circuit 3 into an external-level signal (signal at the Vcc2 level) and outputs it to the outside of the semiconductor device 1 as an output signal.

FIG. 14 is a timing chart for describing the operation of the conventional semiconductor device shown in FIG. 13. As shown in FIG. 14(A), when the supply of the power supply voltage Vcc2 to the semiconductor device 1 is begun, it will be supplied to the step-down circuit 2 and level converter 4.

The step-down circuit 2 drops Vcc2 to Vcc1. As shown in FIG. 14(B), it will take a certain period of time for voltage to stabilize. The internal circuit 3 is in a transient state until Vcc1 stabilizes, and an internal signal output from the internal circuit 3 (see FIG. 14(C)) is indefinite. Vcc1 is also supplied to the level converter 4. The level converter 4 therefore is in a transient state until Vcc1 stabilizes.

Vcc2 is also supplied to the level converter 4. Vcc2 rises faster than Vcc1, so a signal output from the internal circuit 3 and part of a signal generated in the level converter 4 will be output to the outside as an output signal.

As a result, as shown in FIG. 14(D), indefinite output generated by the internal circuit 3 etc. will be output to the outside as an output signal after Vcc1 beginning to rise and before Vcc1 stabilizing. Malfunction therefore can occur in an external circuit connected to the semiconductor device 1.

SUMMARY OF THE INVENTION

In order to address such a problem, the present invention was made. In other words, an object of the present invention is to provide a semiconductor device which can prevent malfunction at the time of power being applied.

In order to achieve the above object, a semiconductor device which operates at an external power supply voltage and an internal power supply voltage being different from the external power supply voltage in voltage is provided. This semiconductor device comprises a processing circuit which operates at the internal power supply voltage for performing a predetermined process, an output circuit for outputting the result of processing by the processing circuit, a control circuit which operates at the external power supply voltage and controls so that output from the output circuit is kept in a predetermined state for a predetermined period of time after the beginning of the supply of the external power supply voltage, and a supply circuit for supplying the external power supply voltage to the control circuit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described with reference to the drawings.

Figure 1:
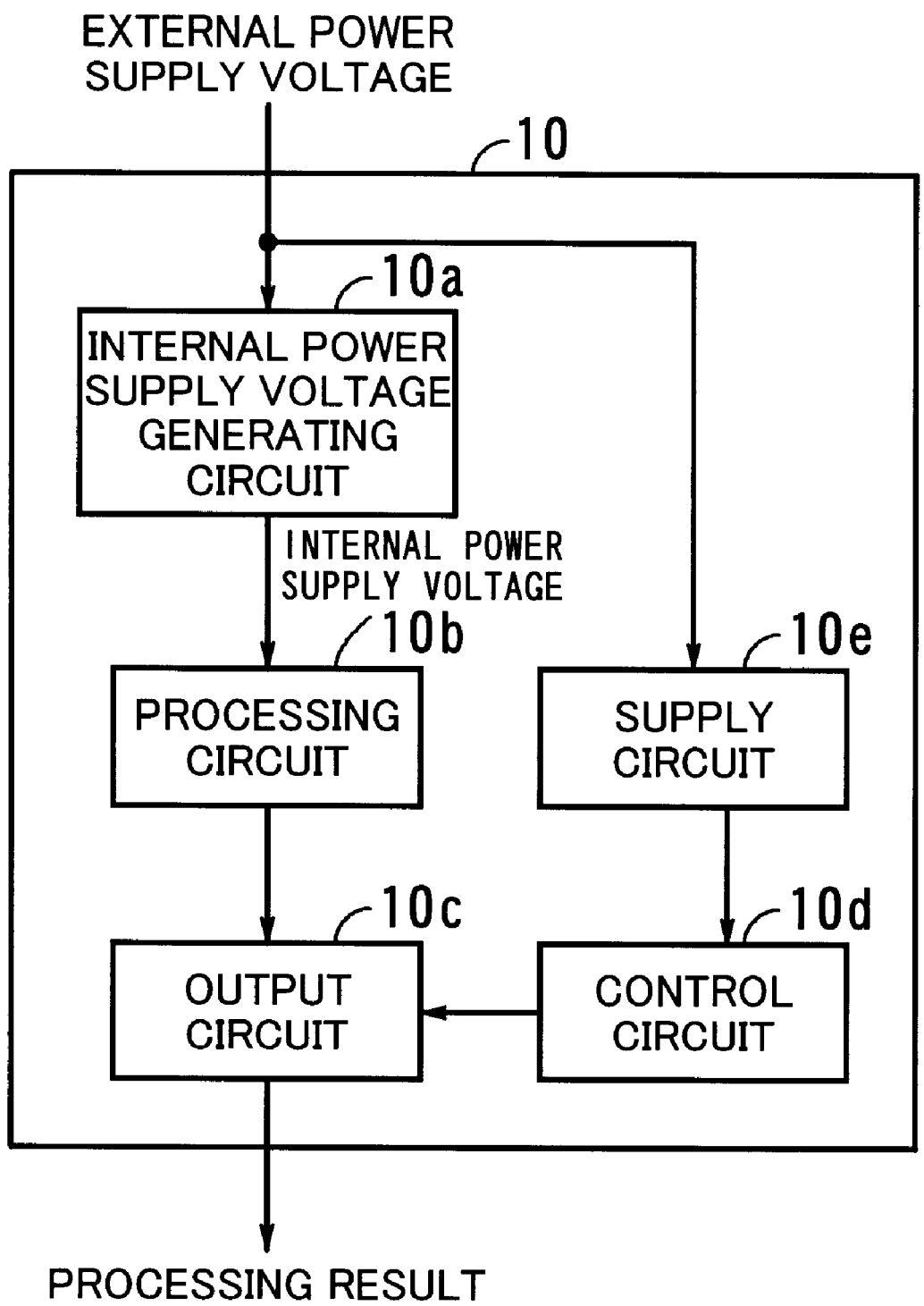
FIG. 1 is a view for describing the principles of operation in the present invention.

FIG. 1 is a view for describing the principles of operation in the present invention. As shown in FIG. 1, a semiconductor device 10 according to the present invention comprises an internal power supply voltage generating circuit 10a, processing circuit 10b, output circuit 10c, control circuit 10d, and supply circuit 10e.

The internal power supply voltage generating circuit 10a converts an external power supply voltage supplied from the outside into a predetermined voltage and outputs it as an internal power supply voltage.

The processing circuit 10b is supplied with an internal power supply voltage output from the internal power supply voltage generating circuit 10a and performs various processes.

The output circuit 10c outputs the result of processing by the processing circuit 10b to the outside.

When the supply of an external power supply voltage to the semiconductor device 10 is begun, the control circuit 10d controls so that output from the output circuit 10c will go into a predetermined state.

The supply circuit 10e supplies an external power supply voltage to the control circuit 10d.

Now, the operation in FIG. 1 will be described.

When the supply of an external power supply voltage to the semiconductor device 10 is begun, the supply circuit 10e supplies the external power supply voltage to the control circuit 10d.

The control circuit 10d is controlled so that output from the output circuit 10c goes into a predetermined state (high-impedance state, for example).

At this time, the internal power supply voltage generating circuit 10a drops the external power supply voltage to generate an internal power supply voltage and outputs it.

When the supply of the internal power supply voltage from the internal power supply voltage generating circuit 10a is begun, the processing circuit 10b supplies an output signal to the output circuit 10c from a port for outputting processing results.

The internal power supply voltage generating circuit 10a generates a reference voltage from an external power supply voltage and generates an internal voltage on the basis of the reference voltage. Therefore, an internal power supply voltage is not output before the external power supply voltage reaches the reference voltage. Moreover, even if the external power supply voltage reaches the reference voltage, it takes a certain period of time for an internal power supply voltage to stabilize. As a result, the processing circuit 10b will be supplied with an internal power supply voltage a certain period of time after the internal power supply voltage generating circuit 10a is supplied with the external power supply voltage.

Output from the processing circuit 10b will be indefinite until an internal power supply voltage which is supplied to the processing circuit 10b stabilizes. However, the output circuit 10c is controlled by the control circuit 10d so that the output circuit 10c will be in a predetermined state. Moreover, the control circuit 10d operates at the external power supply voltage supplied from the supply circuit 10e. The output circuit 10c therefore settles into the predetermined output state before it is supplied with indefinite output. This means that indefinite output from the processing circuit 10b is not output to the outside.

As described above, in the semiconductor device 10 according to the present invention, the output circuit 10c is controlled by the control circuit 10d so that the output circuit 10c will be in a predetermined output state, and the supply circuit 10e supplies the output circuit 10c with an external power supply voltage. This enables the output circuit 10c to settle into a predetermined output state before an internal power supply voltage stabilizing and therefore prevents an indefinite signal from being output.

Now, embodiments of the present invention will be described.

Figure 2:
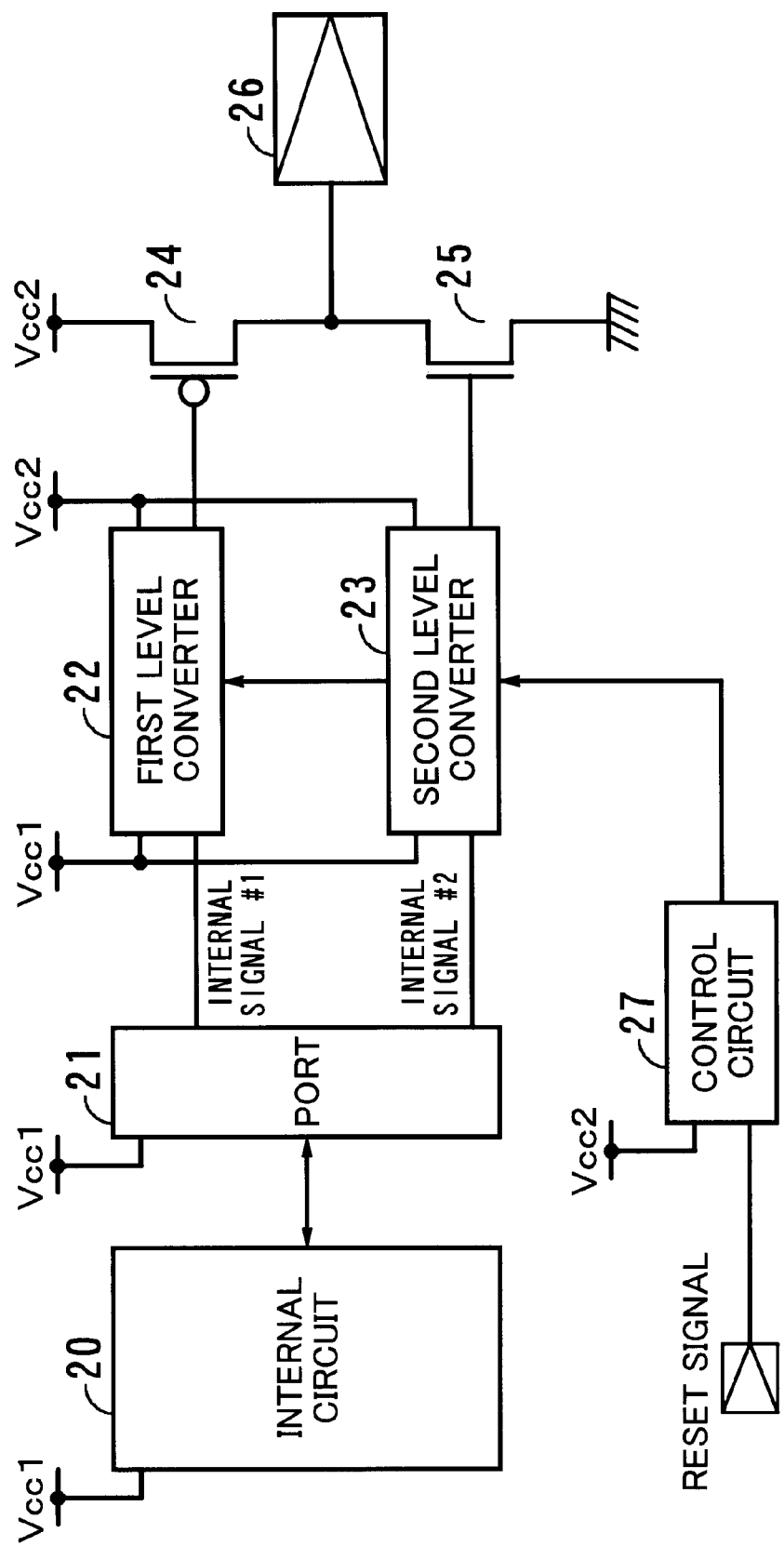
FIG. 2 is a view showing the structure of a semiconductor device according to an embodiment of the present invention.

FIG. 2 is a view showing the structure of a semiconductor device according to an embodiment of the present invention. As shown in FIG. 2, this semiconductor device comprises an internal circuit 20, port 21, first level converter 22, second level converter 23, p-channel metal oxide semiconductor field-effect transistor (MOSFET) 24, n-channel MOSFET 25, external circuit 26, and control circuit 27.

The internal circuit 20 is, for example, a CPU and is the nucleus of the semiconductor device. An internal power supply voltage generating circuit (not shown) supplies internal power supply voltage Vcc1 to the internal circuit 20.

The port 21 is an I/O port for the internal circuit 20, consists of a buffer etc., and is supplied with the internal power supply voltage Vcc1.

The first level converter 22 converts a signal at the level of the internal power supply voltage Vcc1 output from the port 21 into a signal at the level of the external power supply voltage Vcc2 and outputs it. In addition, when power is applied, the first level converter 22 keeps the output in the "H" state in the beginning under the control of the control circuit 27.

The second level converter 23 converts a signal at the level of the internal power supply voltage Vcc1 output from the port 21 into a signal at the level of the external power supply voltage Vcc2 and outputs it. In addition, when power is applied, the second level converter 23 keeps the output in the "L" state in the beginning under the control of the control circuit 27.

The p-channel MOSFET 24 goes into a cutoff state if output from the first level converter 22 is "H." The p-channel MOSFET 24 goes into a conducting state if output from the first level converter 22 is "L."

The n-channel MOSFET 25 goes into a cutoff state if output from the second level converter 23 is "L." The n-channel MOSFET 25 goes into a conducting state if output from the second level converter 23 is "H."

The external circuit 26 is a circuit located outside the semiconductor device, is supplied with the external power supply voltage Vcc2, and performs various processes according to signals output from the p-channel MOSFET 24 and n-channel MOSFET 25.

When a reset signal is supplied to the control circuit 27 from the outside, the control circuit 27 supplies it to the first level converter 22 and second level converter 23. The control circuit 27 is supplied with the external power supply voltage Vcc2.

Figure 3:
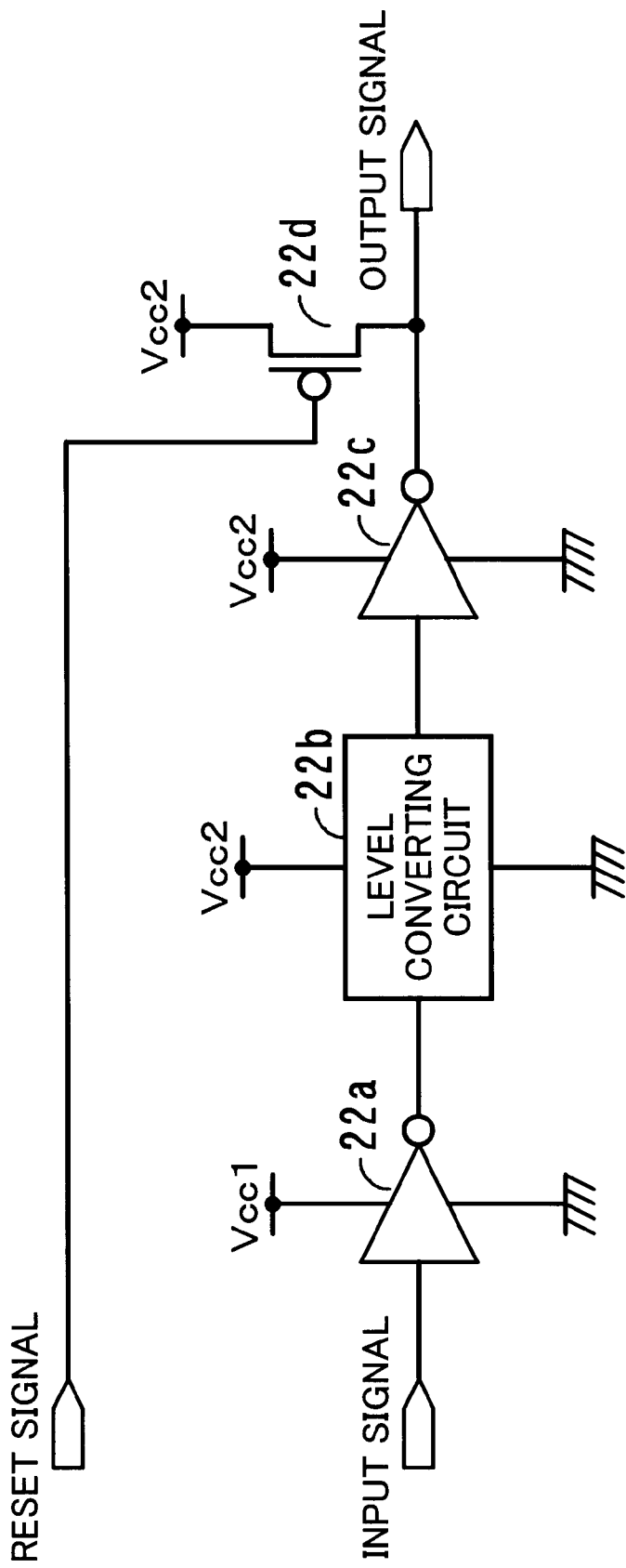
FIG. 3 is a view showing the detailed structure of the first level converter shown in FIG. 2.

FIG. 3 is a view showing the detailed structure of the first level converter 22.

As shown in FIG. 3, the first level converter 22 includes an inverter 22a, level converting circuit 22b, inverter 22c, and p-channel MOSFET 22d.

The inverter 22a is supplied with the internal power supply voltage Vcc1 and inverts and outputs an input signal.

The level converting circuit 22b accepts a signal output from the inverter 22a, increases the voltage of the signal to the level of the external power supply voltage Vcc2, and outputs the signal.

The inverter 22c is supplied with the external power supply voltage Vcc2 and inverts and outputs output from the level converting circuit 22b.

If a reset signal is in the "L" state (active state), the p-channel MOSFET 22d goes into a conducting state and puts a signal output from the inverter 22c into the "H" state compulsorily. If a reset signal is in the "H" state, the p-channel MOSFET 22d goes into a cutoff state and outputs a signal output from the inverter 22c as it is.

Figure 4:
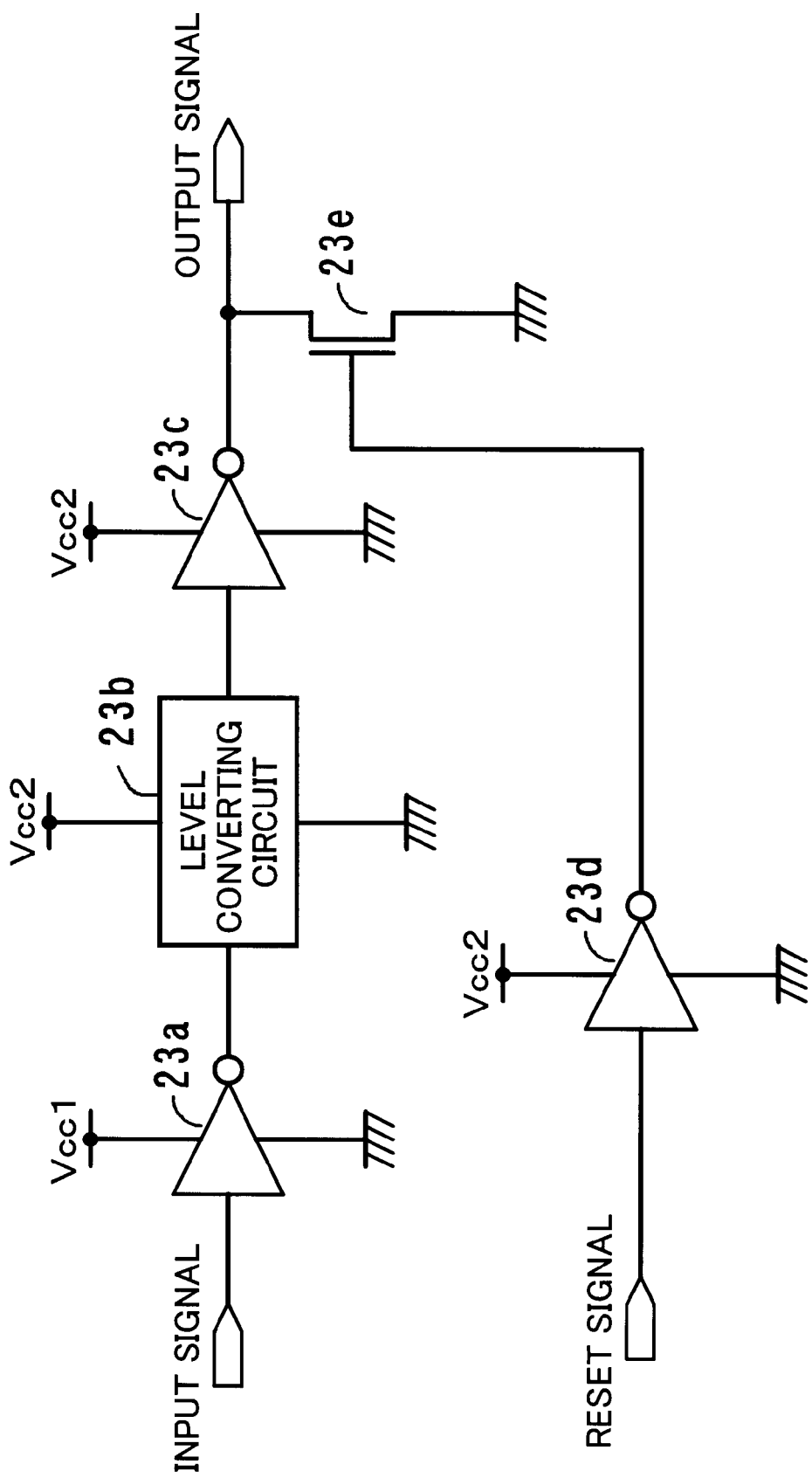
FIG. 4 is a view showing the detailed structure of the second level converter shown in FIG. 2.

FIG. 4 is a view showing the detailed structure of the second level converter 23.

As shown in FIG. 4, the second level converter 23 includes an inverter 23a, level converting circuit 23b, inverter 23c, inverter 23d, and n-channel MOSFET 23e.

The inverter 23a is supplied with the internal power supply voltage Vcc1 and inverts and outputs an input signal.

The level converting circuit 23b accepts a signal output from the inverter 23a, increases the voltage of the signal to the level of the external power supply voltage Vcc2, and outputs the signal.

The inverter 23c is supplied with the external power supply voltage Vcc2 and inverts and outputs output from the level converting circuit 23b.

The inverter 23d is supplied with the external power supply voltage Vcc2 and inverts and outputs a reset signal.

If a reset signal is in the "L" state (active state), output from the inverter 23d goes into the "H" state. Therefore, the n-channel MOSFET 23e goes into a conducting state and puts a signal output from the inverter 23c into the "L" state compulsorily. If a reset signal is in the "H" state, the n-channel MOSFET 23e goes into a cutoff state and outputs a signal output from the inverter 23c as it is.

Now, operation in the above embodiment will be described.

Figure 5:
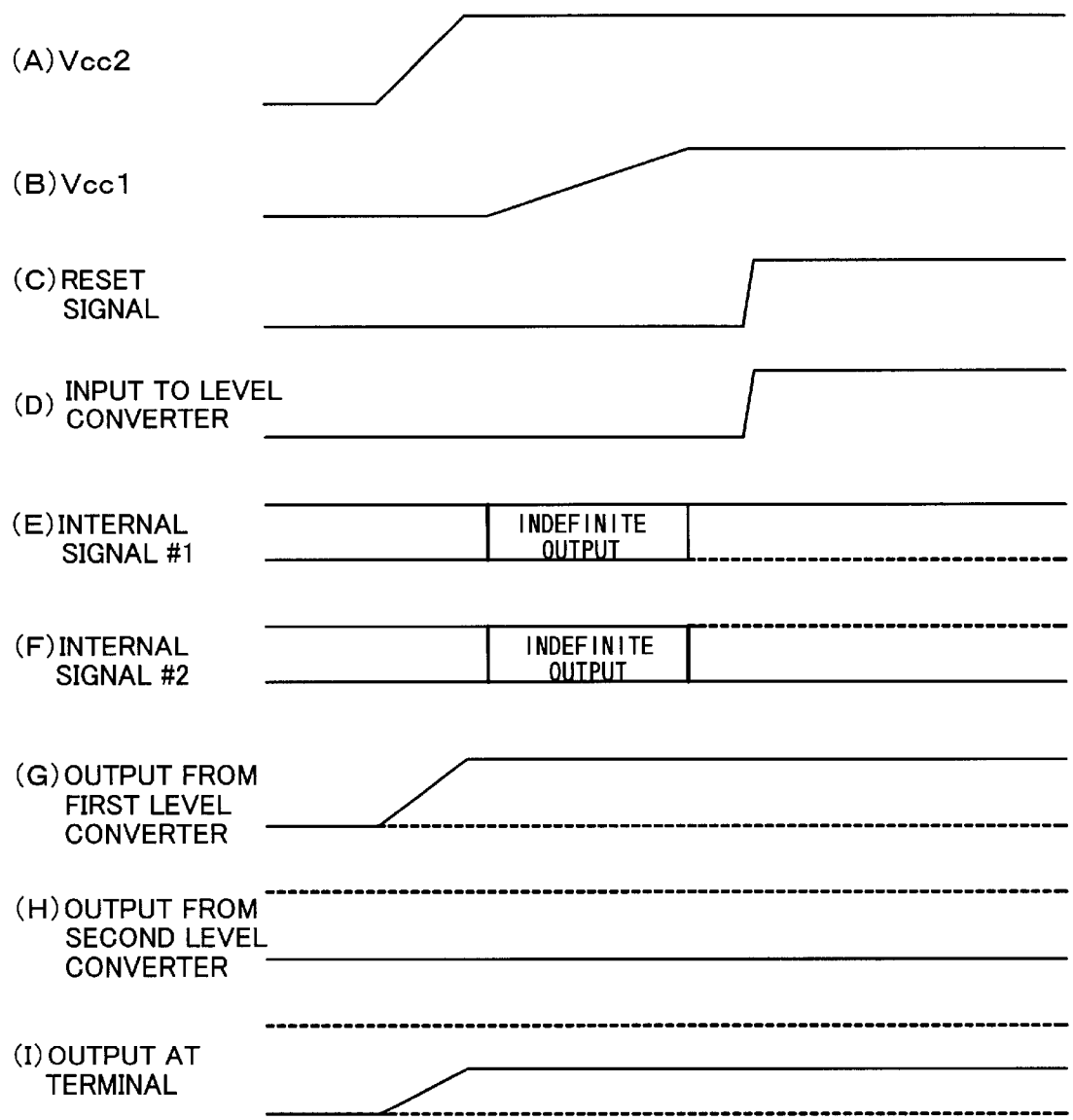
FIG. 5 is a timing chart for describing operation in the embodiment shown in FIG. 2.

FIG. 5 is a timing chart for describing operation in the embodiment shown in FIG. 2. As shown in FIG. 5(A), when the supply of the external power supply voltage Vcc2 is begun, Vcc2 is supplied to the first level converter 22, second level converter 23, p-channel MOSFET 24, and control circuit 27.

When the supply of Vcc2 is begun, a reset signal (see FIG. 5(C)) generated on the basis of Vcc2 is supplied to the control circuit 27. The control circuit 27 is supplied with the external power supply voltage Vcc2. The control circuit 27 begins to operate the moment the external power supply voltage Vcc2 is applied to it. The control circuit 27 puts the reset signal supplied to the first level converter 22 and second level converter 23 into an active state ("L" state) (see FIG. 5(D)).

As shown in FIG. 3, the external power supply voltage Vcc2 is supplied to the p-channel MOSFET 22d in the first level converter 22, so the p-channel MOSFET 22d goes into an operable state the moment the external power supply voltage Vcc2 is supplied to it. The reset signal is also generated on the basis of the external power supply voltage Vcc2, so it goes into the "L" state from the very first when the external power supply voltage Vcc2 is applied. Output from the p-channel MOSFET 22d in the first level converter 22 therefore goes into the "H" state (see FIG. 5(G)). As a result, the p-channel MOSFET 24 goes into a cutoff state.

On the other hand, the external power supply voltage Vcc2 is also supplied to the inverter 23d in the second level converter 23. Therefore, the n-channel MOSFET 23e goes into an operable state the moment the external power supply voltage Vcc2 is supplied to the inverter 23d. Moreover, as stated above, the reset signal is also generated on the basis of the external power supply voltage Vcc2, so it goes into the "L" state from the very first when the external power supply voltage Vcc2 is applied. Output from the n-channel MOSFET 23e in the second level converter 23 therefore goes into the "L" state (see FIG. 5(H)). As a result, the n-channel MOSFET 25 goes into a cutoff state.

Both the p-channel MOSFET 24 and n-channel MOSFET 25 go into a cutoff state in this way, so output at a terminal to which the external circuit 26 is connected will go into a high-impedance state (see FIG. 5(I)).

Furthermore, when the external power supply voltage Vcc2 exceeds a predetermined threshold, an internal power supply voltage generating circuit (not shown) begins to generate the internal power supply voltage Vcc1 (see FIG. 5(B)) and Vcc1 is supplied to the internal circuit 20, port 21, first level converter 22, and second level converter 23.

When the supply of Vcc1 is begun, the internal circuit 20 and port 21 will go into a transient state and indefinite signals will be output from the port 21 as internal signals #1 and #2 (see FIGS. 5(E) and 5(F)).

These indefinite signals are supplied to the first level converter 22 and second level converter 23 respectively. Output from these level converters has compulsorily been put into the "H" and "L" states, respectively, by the reset signal. Therefore, even if the indefinite signals are input to these level converters, output from these level converters will not change. As a result, the state of output at the terminal to which the external circuit 26 is connected will not change (output at the terminal will be kept in the high-impedance state).

When the reset signal goes into the "H" state (inactive state) after a predetermined period of time (see FIG. 5(C)), output from the control circuit 27 also goes into the "H" state (see FIG. 5(D)).

As a result, the p-channel MOSFET 22d in the first level converter 22 goes into a cutoff state and a signal output from the inverter 22c will be output directly.

On the other hand, output from the inverter 23d in the second level converter 23 goes into the "H" state. As a result, the n-channel MOSFET 23e goes into a cutoff state and a signal output from the inverter 23c will be output directly.

Therefore, the levels of the internal signal #1 (see FIG. 5(E)) and internal signal #2 (see FIG. 5(F)) output from the port 21 are converted by the first level converter 22 and second level converter 23 respectively, then the internal signal #1 and internal signal #2 are supplied to the p-channel MOSFET 24 and n-channel MOSFET 25 respectively.

As a result, when the reset signal goes into the "H" state, a signal corresponding to the internal signal #1 and internal signal #2 output from the port 21 will be output to the external circuit 26.

As described above, in the embodiment of the present invention, output from the first level converter 22 and second level converter 23 is kept compulsorily in a predetermined state by a reset signal until the output stabilizes. This prevents malfunction caused by an indefinite signal supplied to the external circuit 26.

Figure 6:
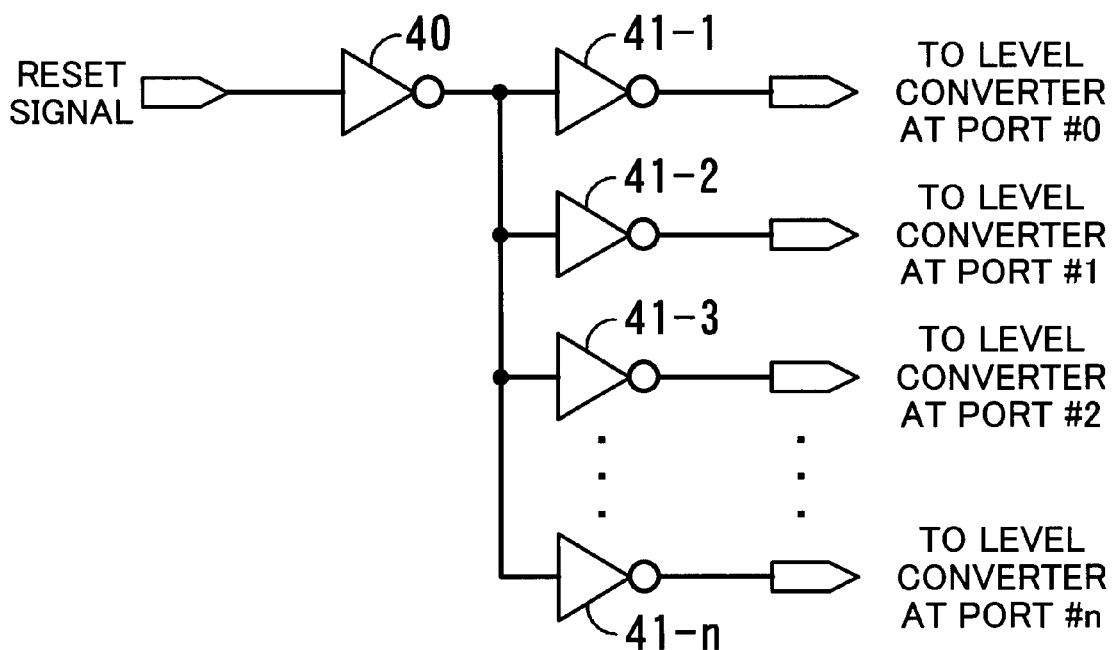
FIG. 6 is a view showing the detailed structure of an example of the control circuit shown in FIG. 2.

In the above embodiment, a case where there is a single port 21 has been described. However, it is a matter of course that the present invention is applicable to cases where there is a plurality of ports. Such cases can be coped with by using a control circuit shown in FIG. 6.

This control circuit includes an inverter 40 and inverters 41-1 through 41-n. The inverter 40 inverts and outputs an input reset signal. The inverters 41-1 through **41-*n* once more invert a signal output from the inverter 40 and supply the inverted signals to ports #0 through #n respectively. All the inverter 40 and inverters 41-1 through 41-*n*** are supplied with Vcc2.

With this embodiment, the present invention is also applicable to a semiconductor device including a plurality of ports. As a result, malfunction in an external circuit can be prevented.

Figure 7:
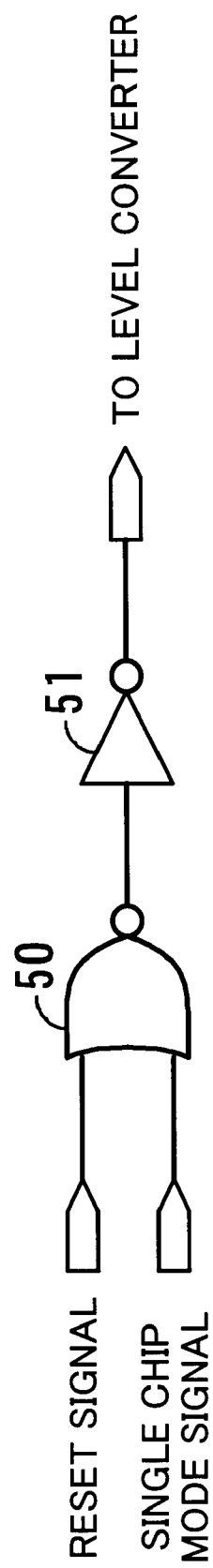
FIG. 7 is a view showing the detailed structure of another example of the control circuit shown in FIG. 2.

FIG. 7 is a view showing the structure of another example of the control circuit 27. In this example, the control circuit 27 includes a NOR element 50 and inverter 51 and a reset signal and single chip mode signal are input to the NOR element 50.

A single chip mode is one in which the internal circuit 20 operates independently of the external circuit 26. A single chip mode signal is one which goes into the "L" state to cause the internal circuit 20 to operate in the single chip mode.

In this embodiment, a reset signal is sent to the inverter 51 only when a single chip mode signal is in the "L" state, that is to say, only when the internal circuit 20 is operating in the single chip mode. Therefore, if the internal circuit 20 is operating in the single chip mode, a terminal to which the external circuit 26 is connected will go into a high-impedance state when a reset signal goes into an active state.

As described above, in this embodiment, a terminal to which the external circuit 26 is connected will go into a high-impedance state in the single chip mode, in which the internal circuit 20 operates independently, the moment a reset signal goes into an active state. This prevents malfunction in the external circuit 26 caused by an indefinite signal output thereto.

In the above embodiments, the control circuit 27 controls the first level converter 22 and second level converter 23 according to a reset signal. However, the first level converter 22 and second level converter 23 can be controlled according to the state of the internal power supply voltage Vcc1.

Figure 8:
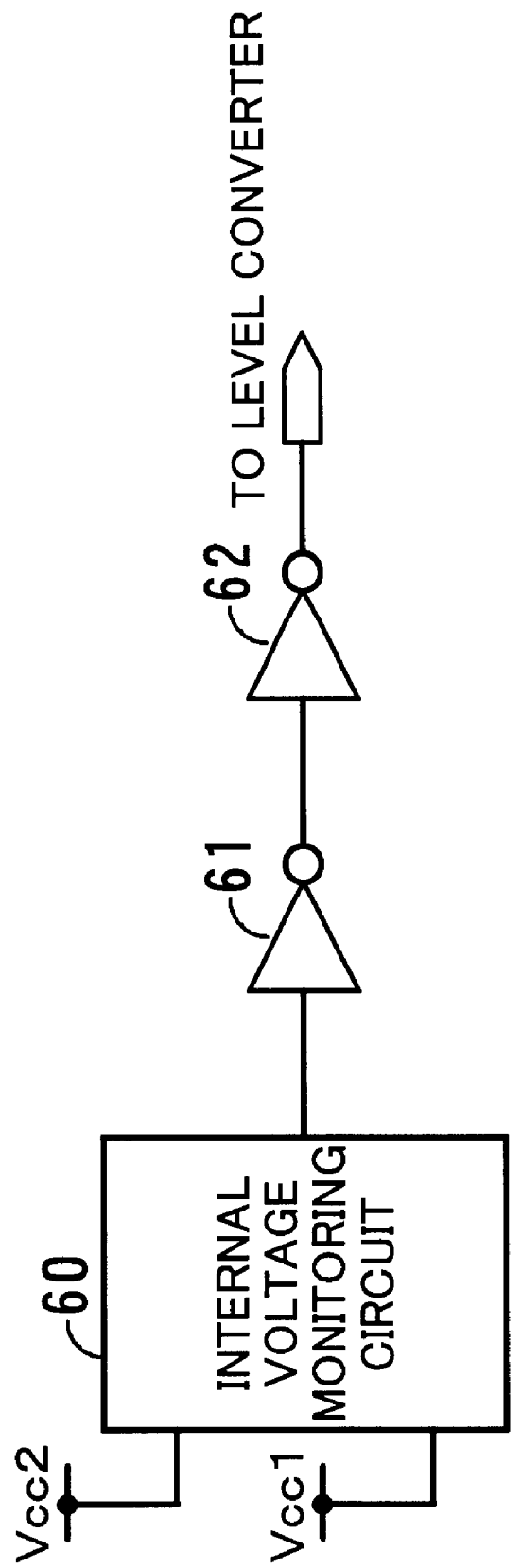
FIG. 8 is a view showing the detailed structure of still another example of the control circuit shown in FIG. 2.

FIG. 8 is a view showing the structure of a control circuit which operates according to the internal power supply voltage Vcc1. This control circuit includes an internal voltage monitoring circuit 60, inverter 61, and inverter 62.

The internal voltage monitoring circuit 60 operates with Vcc2 as power supply voltage. If Vcc1 reaches a defined voltage (threshold), then the internal voltage monitoring circuit 60 puts its output signal into the "H" state. If Vcc1 does not reach a defined voltage, then the internal voltage monitoring circuit 60 outputs a "L" signal.

The inverters 61 and 62 operate with Vcc2 as power supply voltage and invert and output the output of the internal voltage monitoring circuit 60 and inverter 61 respectively.

Now, operation in the above control circuit will be described.

When the supply of the external power supply voltage Vcc2 is begun, the internal voltage monitoring circuit 60 begins to monitor the internal power supply voltage Vcc1. In this case, the internal voltage monitoring circuit 60 puts its output signal into the "L" state. When Vcc1 exceeds a predetermined threshold, the internal voltage monitoring circuit 60 puts its output signal into the "H" state.

Each of the inverters 61 and 62 inverts and outputs the output of the internal voltage monitoring circuit 60. Therefore, if a signal output from the internal voltage monitoring circuit 60 is in the "L" state, then a signal output from the first level converter 22 goes into the "H" state and output from the second level converter 23 goes into the "L" state. AS a result, a terminal to which the external circuit 26 is connected will go into a high-impedance state.

When Vcc1 exceeds the predetermined threshold, output from the internal voltage monitoring circuit 60 goes into the "H" state. As a result, both the p-channel MOSFET 22*d* in the first level converter 22 and n-channel MOSFET 23*e* in the second level converter 23 go into a cutoff state and output from the inverter 22*c* and inverter 23*c* will be output as it is. Therefore, a signal output from the port 21 will be supplied to the external circuit 26.

As stated above, the internal voltage monitoring circuit 60 which operates at the external power supply voltage Vcc2 is used for controlling the first level converter 22 and second level converter 23 until the internal power supply voltage Vcc1 reaching the defined voltage. This prevents malfunction caused by indefinite output supplied to the external circuit 26.

Figure 9:
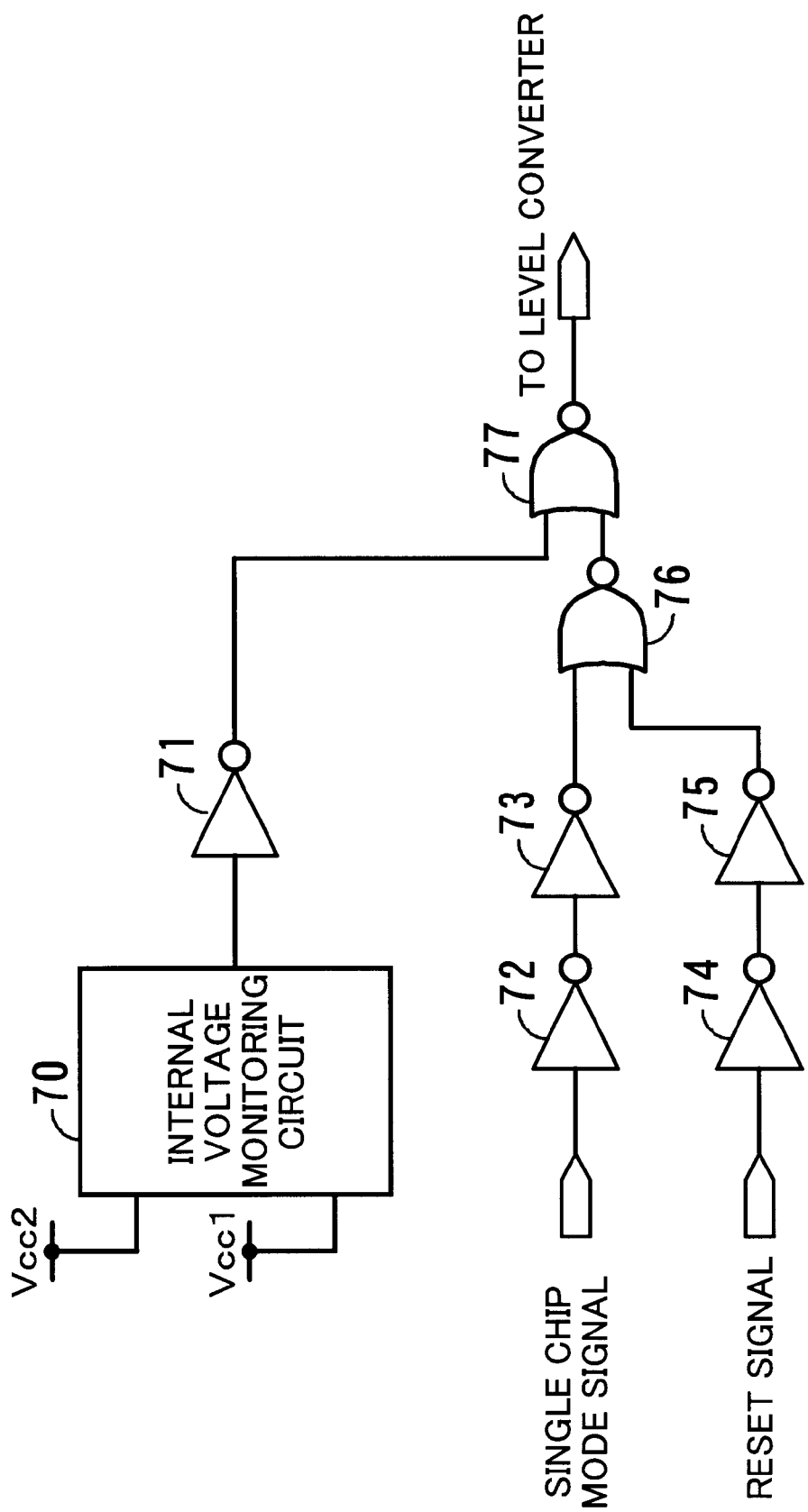
FIG. 9 is a view showing the structure of another embodiment of the present invention.

FIG. 9 is a view showing an embodiment being a combination of the embodiment shown in FIG. 7 and the embodiment shown in FIG. 8. This control circuit includes an internal voltage monitoring circuit 70, inverter 71, inverters 72 through 75, NOR elements 76 and 77. All the circuits and elements shown in FIG. 9 are supplied with the external power supply voltage Vcc2.

The internal voltage monitoring circuit 70 has the same circuit structure as the internal voltage monitoring circuit 60 shown in FIG. 8 and operates the same.

The inverter 71 inverts a signal output from the internal voltage monitoring circuit 70 and supplies it to the NOR element 77.

The inverter 72 inverts a single chip mode signal and supplies it to the inverter 73. The inverter 73 inverts a signal output from the inverter 72 and supplies it to the NOR element 76.

The inverter 74 inverts a reset signal and supplies it to the inverter 75. The inverter 75 inverts a signal output from the inverter 74 and supplies it to the NOR element 76.

The NOR element 76 carries out the inverted OR between output from the inverter 73 and output from the inverter 75 and outputs the result.

The NOR element 77 carries out the inverted OR between output from the inverter 71 and output from the NOR element 76 and outputs the result.

Now, operation in the above embodiment will be described.

When power is applied and the supply of the power supply voltage Vcc2 is begun, the internal voltage monitoring circuit 70 judges whether Vcc1 has reached a defined voltage. If Vcc1 has reached the defined voltage, then the internal voltage monitoring circuit 70 puts its output into the "H" state. If Vcc1 has not reached the defined voltage, then the internal voltage monitoring circuit 70 puts its output into the "L" state. As a result, output from the inverter 71 goes into the "L" state if Vcc1 is higher than the defined voltage. Output from the inverter 71 goes into the "H" state if Vcc1 is lower than the defined voltage.

Output from the NOR element 76 goes into the "H" state if the single chip mode is active ("L") and a reset signal is active ("L"). Output from the NOR element 76 goes into the "L" state if these conditions are not met.

Output from the NOR element 77 therefore goes into the "H" state if Vcc1 is higher than the defined voltage and a single chip mode signal or reset signal is inactive. Output from the NOR element 77 goes into the "L" state if these conditions are not met.

In other words, the first level converter 22 and second level converter 23 are kept compulsorily initialized until the internal power supply voltage Vcc1 reaches the defined voltage. After Vcc1 stabilizes, the first level converter 22 and second level converter 23 will be kept initialized only if the single chip mode is active and a reset signal becomes active.

In the above embodiment, the state of a terminal to which the external circuit 26 is connected can be kept compulsorily in a predetermined state (high-impedance state) until the internal power supply voltage Vcc1 stabilizes. After the internal power supply voltage Vcc1 stabilizes, the state of the terminal can be kept compulsorily in the predetermined state only if a reset signal becomes active in the single chip mode.

Figure 10:
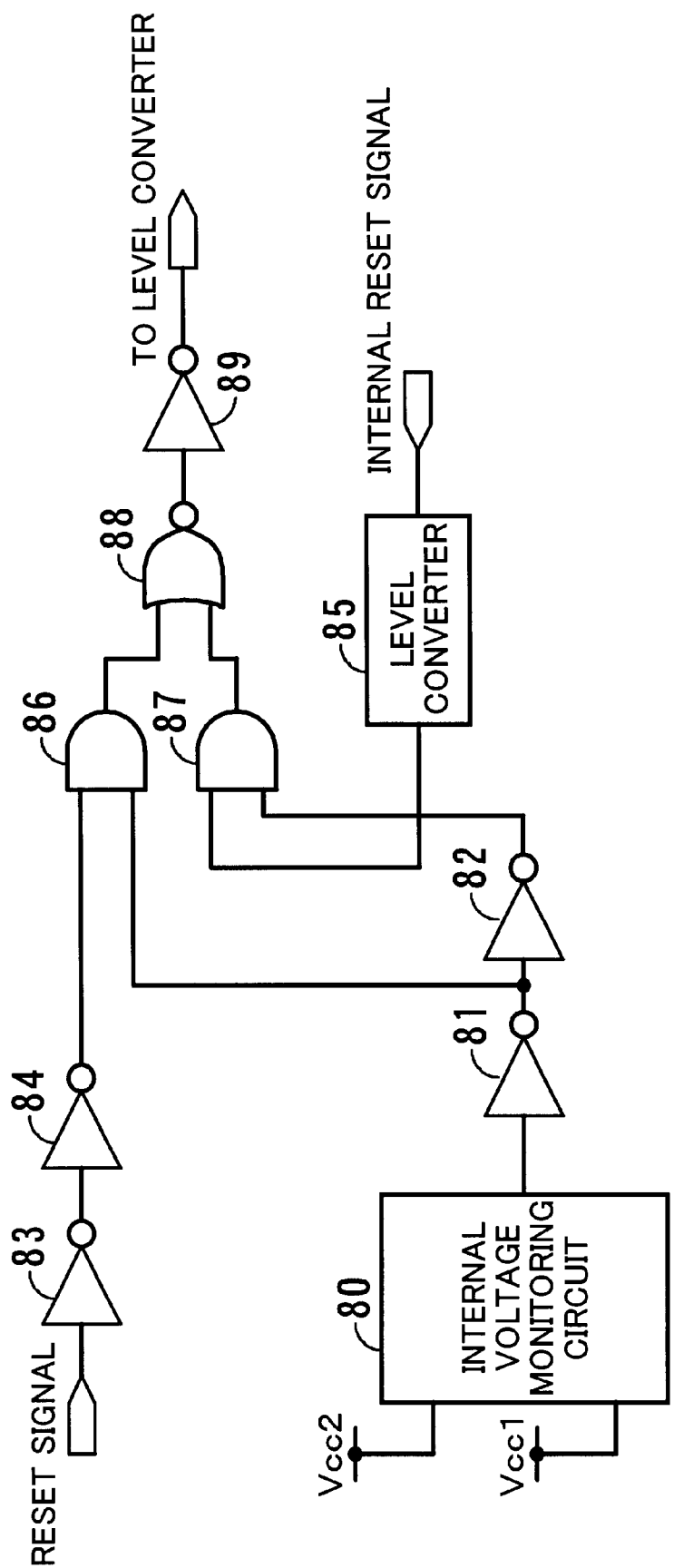
FIG. 10 is a view showing the structure of still another embodiment of the present invention.

FIG. 10 is a view showing an embodiment which accepts a reset by a reset signal from the outside before the internal power supply voltage Vcc1 stabilizes and which accepts only a reset by an internal reset signal after the internal power supply voltage Vcc1 stabilizes.

The embodiment shown in FIG. 10 includes an internal voltage monitoring circuit 80, inverters 81 and 82, inverters 83 and 84, level converter 85, AND elements 86 and 87, NOR element 88, and inverter 89.

The internal voltage monitoring circuit 80 uses the external power supply voltage Vcc2 as power supply voltage and observes whether the internal power supply voltage Vcc1 has reached a defined voltage. If the internal power supply voltage Vcc1 has reached the defined voltage, the internal voltage monitoring circuit 80 outputs "H." If the internal power supply voltage Vcc1 has not reached the defined voltage, the internal voltage monitoring circuit 80 outputs "L."

The inverter 81 inverts a signal output from the internal voltage monitoring circuit 80 and supplies it to the inverter 82 and AND element 86.

The inverter 82 inverts a signal output from the inverter 81 and supplies it to the AND element 87.

The inverter 83 inverts a reset signal and supplies it to the inverter 84. The inverter 84 inverts a signal output from the inverter 83 and supplies it to the AND element 86.

The level converter 85 converts an internal reset signal at the level of the internal power supply voltage Vcc1 into a signal at the level of the external power supply voltage Vcc2 and supplies it to the AND element 87.

The AND elements 86 carries out the logical AND between output from the inverter 81 and output from the inverter 84 and supplies the result to the NOR element 88.

The AND element 87 carries out the logical AND between output from the inverter 82 and output from the level converter 85 and supplies the result to the NOR element 88.

The NOR element 88 carries out the logical AND between output from the AND element 86 and output from the AND element 87 and supplies the result to the inverter 89.

The inverter 89 inverts a signal output from the NOR element 88 and supplies it to the first level converter 22 and second level converter 23.

Now, operation in the above embodiment will be described.

When power is applied and the supply of the external power supply voltage Vcc2 is begun, the internal voltage monitoring circuit 80 observes whether the internal power supply voltage Vcc1 has reached a defined voltage. If the internal power supply voltage Vcc1 has not reached the defined voltage, the internal voltage monitoring circuit 80 outputs "L." If the internal power supply voltage Vcc1 has reached the defined voltage, the internal voltage monitoring circuit 80 outputs "H."

It is assumed that the internal power supply voltage Vcc1 has not reached the defined voltage yet. Then output from the inverter 81 is "H" and output from the inverter 82 is "L." Therefore, output from the AND element 87 is "L" regardless of output from the level converter 85. Output from the AND element 86 is "L" if a reset signal is active. Output from the AND element 86 is "H" if a reset signal is inactive. The NOR element 88 and inverter 89 form one OR element. Therefore, output from the inverter 89 is "L" if a reset signal is "L." Output from the inverter 89 is "H" if a reset signal is "H." In this case, the state of an internal reset signal has no influence on that of output from the inverter 89.

In other words, if the internal power supply voltage Vcc1 has not reached the defined voltage, "L" is input to the first level converter 22 and second level converter 23 if a reset signal becomes active. As a result, output from the first level converter 22 and second level converter 23 is put compulsorily into a predetermined state. In this case, the state of an internal reset signal has no influence on that of input to the first level converter 22 and second level converter 23.

If the internal power supply voltage Vcc1 reaches the defined voltage, then output from the internal voltage monitoring circuit 80 goes into the "H" state. Therefore, output from the inverter 81 goes into the "L" state and output from the inverter 82 goes into the "H" state.

When output from the inverter 81 goes into the "L" state, output from the AND element 86 always goes into the "L" state. In this case, the state of a reset signal has no influence on that of output from the AND element 86.

Output from the inverter 82 goes into the "H" state, so output from the AND element 87 goes into the "H" state if output from the level converter 85 is in the "H" state. If output from the level converter 85 is in the "L" state, then output from the AND element 87 goes into the "L" state.

Therefore, if the internal power supply voltage Vcc1 has reached the defined voltage, a reset signal is ignored and output from the first level converter 22 and second level converter 23 can be initialized to a predetermined state only by an internal reset signal.

In summary, in the embodiment shown in FIG. 10, the semiconductor device can be reset by a reset signal from the outside if the internal power supply voltage Vcc1 has not reached a defined voltage (just after the time when). If the internal power supply voltage Vcc1 has reached the defined voltage, the semiconductor device can be reset only by an internal reset signal.

In the above embodiments, an output terminal on the semiconductor device was put into a high-impedance state when, for example, a reset signal is input. However, it can be put into, for example, the "H" or "L" state.

Figure 11:
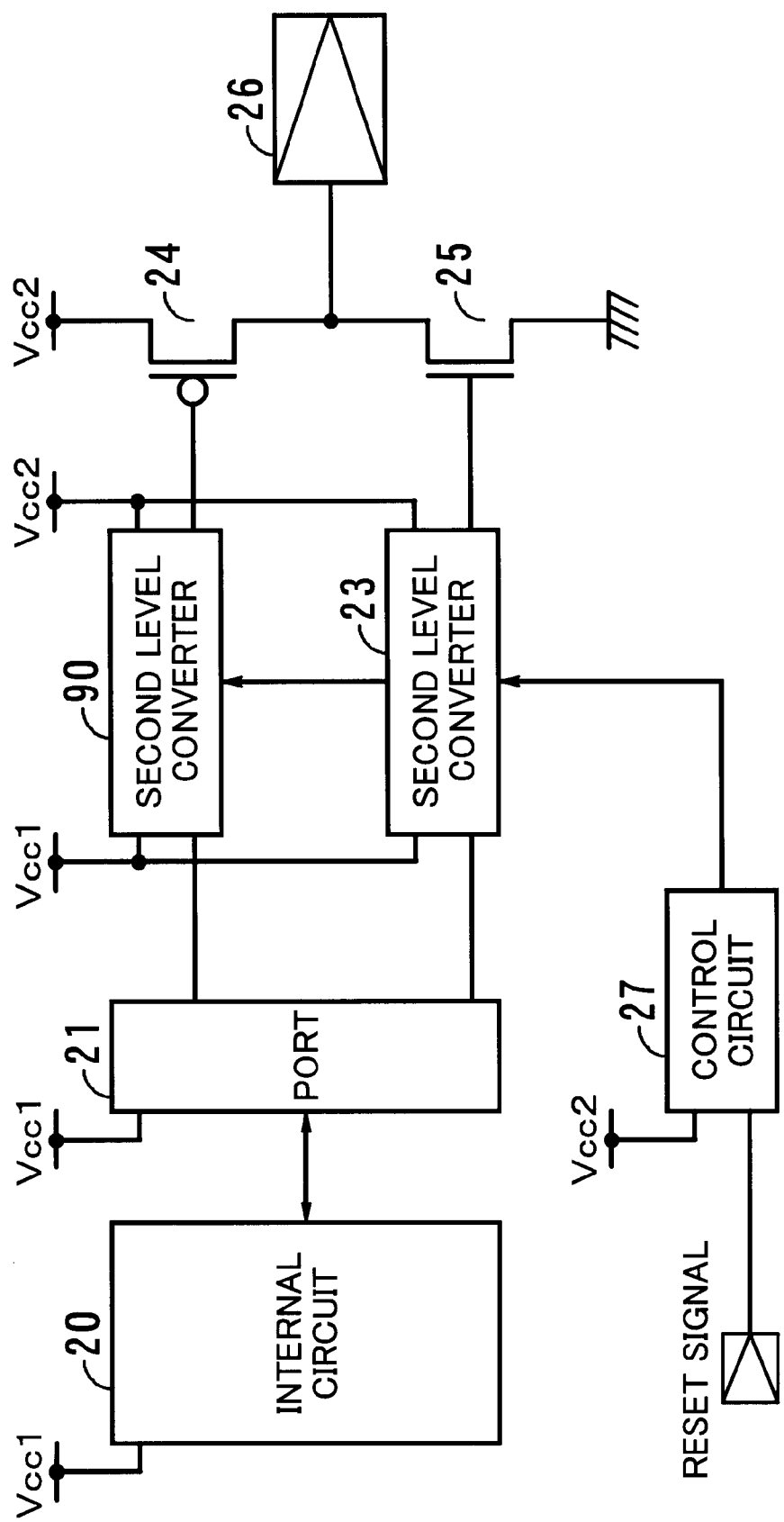
FIG. 11 is a view showing the structure of still another embodiment of the present invention.

FIG. 11 is a view showing an embodiment output from which becomes "H" in the case of a reset signal being made active.

In this example, the first level converter 22 shown in FIG. 2 is replaced by a second level converter 90. The rest of the components are the same as those in FIG. 2. The components shown in FIG. 11 which correspond to those in FIG. 2 are given the same symbols and descriptions of them will be omitted.

In this embodiment, when a reset signal goes into an active state ("L" state), output from both the second level converter 90 and second level converter 23 goes into the "L" state. As a result, the p-channel MOSFET 24 goes into a conducting state and n-channel MOSFET 25 goes into a cutoff state. Therefore, output at a terminal to which the external circuit 26 is connected will go into the "H" state.

In the above embodiment, if a reset signal becomes active, output from the semiconductor device can be set compulsorily to the "H" state.

Figure 12:
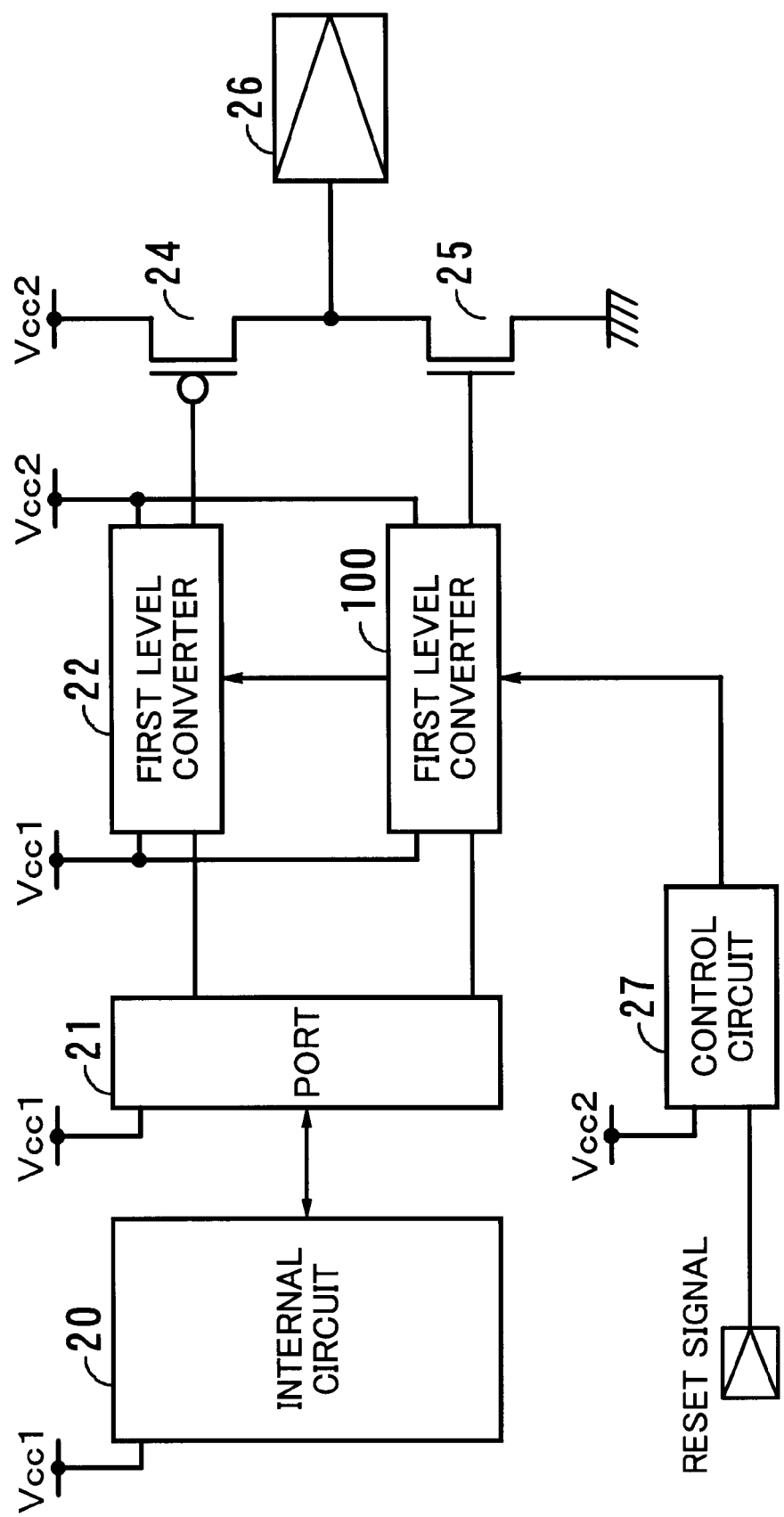
FIG. 12 is a view showing the structure of still another embodiment of the present invention.
Figure 13:
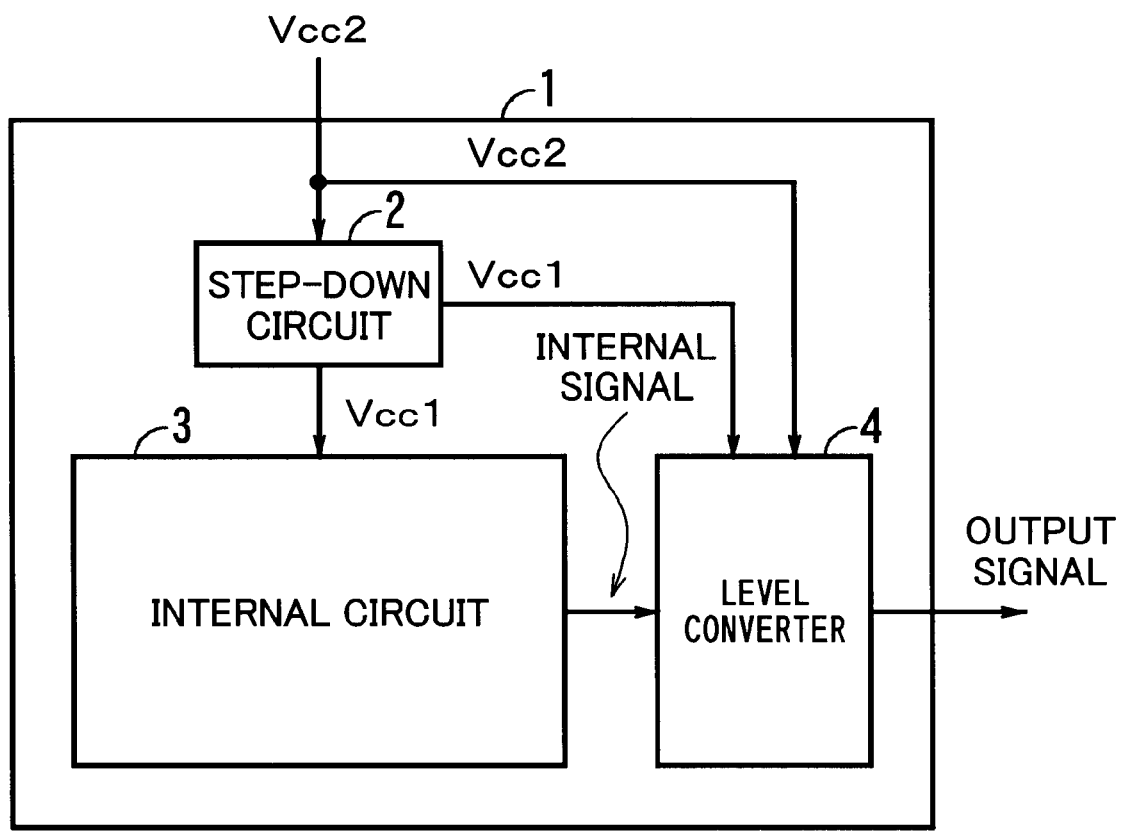
FIG. 13 is a view showing the structure of a conventional semiconductor device.
Figure 14:
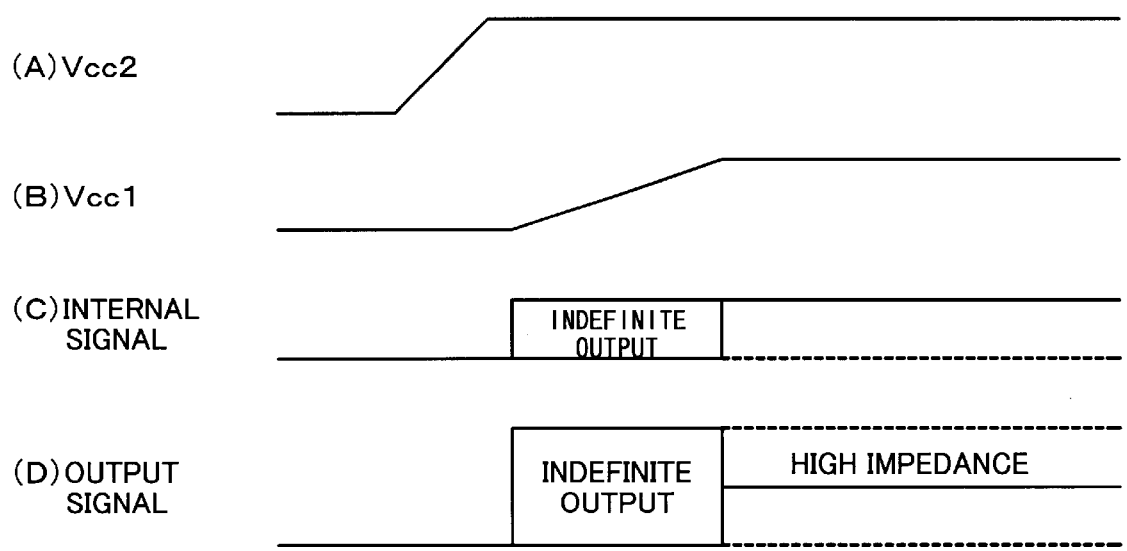
FIG. 14 is a timing chart for describing the operation of the conventional semiconductor device shown in FIG. 13.

FIG. 12 is a view showing an embodiment output from which becomes "L" in the case of a reset signal being made active.

In this example, the second level converter 23 shown in FIG. 2 is replaced by a first level converter 100. The rest of the components are the same as those in FIG. 2. The components shown in FIG. 12 which correspond to those in FIG. 2 are given the same symbols and descriptions of them will be omitted.

In this embodiment, when a reset signal goes into an active state ("L" state), output from both the first level converter 22 and first level converter 100 goes into the "H" state. As a result, the p-channel MOSFET 24 goes into a cutoff state and n-channel MOSFET 25 goes into a conducting state. Therefore, output at a terminal to which the external circuit 26 is connected will go into the "L" state.

In the above embodiment, if a reset signal becomes active, output from the semiconductor device can be set compulsorily to the "L" state.

In the above embodiments, descriptions of a case where the output circuit 10c shown in FIG. 1 is a level converter were given. However, it is a matter of course that the present invention is not limited to such a case.

Moreover, in the above embodiments, descriptions of a case where there is only one internal power supply voltage (Vcc1) were given. However, it is a matter of course that the present invention is applicable to cases where there are a plurality of internal power supply voltages.

Furthermore, in the above embodiments, only the external power supply voltage Vcc2 is supplied to the semiconductor device and the semiconductor device generates the internal power supply voltage Vcc1 from the external power supply voltage Vcc2. However, it is a matter of course that the internal power supply voltage Vcc1 can also be supplied from the outside.

As has been described in the foregoing, the semiconductor device which operates at an external power supply voltage and an internal power supply voltage being different from the external power supply voltage in voltage, according to the present invention, comprises a processing circuit which is operated at the internal power supply voltage for performing a predetermined process, an output circuit for outputting the result of processing by the processing circuit, a control circuit which is operated at the external power supply voltage for controlling so that output from the output circuit will be kept in a predetermined state for a predetermined period of time after the beginning of the supply of the external power supply voltage, and a supply circuit for supplying the external power supply voltage to the control circuit. Therefore, when power is applied, malfunction in an external circuit caused by output of an indefinite signal can be prevented.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A semiconductor device which operates at an external power supply voltage and an internal power supply voltage being different from the external power supply voltage in voltage, the device comprising:
    a processing circuit which operates at the internal power supply voltage and performs a predetermined process;
    an output circuit for outputting the result of processing by the processing circuit;
    a control circuit which operates at the external power supply voltage and controls so that output from the output circuit is kept in a predetermined state for a predetermined period of time after the beginning of the supply of the external power supply voltage; and
    a supply circuit for supplying the external power supply voltage to the control circuit;
    wherein the control circuit puts output from the output circuit compulsorily into an "H" state.

2. The semiconductor device according to claim 1, further comprising an internal power supply voltage generating circuit for generating the internal power supply voltage from the external power supply voltage.

3. The semiconductor device according to claim 1, wherein the output circuit is a level converter and converts a signal at the internal power supply voltage level output from the processing circuit into a signal at the external power supply voltage level.

4. The semiconductor device according to claim 1, wherein the control circuit puts output from the output circuit compulsorily into an "L" state.

5. The semiconductor device according to claim 1, wherein the control circuit controls the output circuit according to a reset signal generated on the basis of the external power supply voltage.

6. The semiconductor device according to claim 5, wherein the control circuit controls the output circuit according to the reset signal only if the processing circuit is in a predetermined operation mode.

7. The semiconductor device according to claim 5, wherein the control circuit ignores the reset signal if the supply of the internal power supply voltage once stabilizes.

8. The semiconductor device according to claim 7, wherein even if the supply of the internal power supply voltage once stabilizes, the control circuit controls the state of output from the output circuit in the case of an internal reset signal being supplied.

9. The semiconductor device according to claim 1, wherein the control circuit controls the output circuit until the internal power supply voltage reaches a defined voltage.

10. The semiconductor device according to claim 1, wherein the control circuit controls the output circuit only if the processing circuit is in a predetermined operation mode.

11. The semiconductor device according to claim 1, wherein:
    when the internal power supply voltage has not reached the defined voltage, the output circuit is controlled unconditionally; and
    when the internal power supply voltage has reached the defined voltage, the state of output from the output circuit is controlled only if the processing circuit is in a predetermined operation mode and a reset signal generated on the basis of the external power supply voltage is input.

12. A semiconductor device which operates at an external power supply voltage and an internal power supply voltage being different from the external power supply voltage in voltage, the device comprising:

a processing circuit which operates at the internal power supply voltage and performs a predetermined process;

an output circuit for outputting the result of processing by the processing circuit;

a control circuit which operates at the external power supply voltage and controls so that output from the output circuit is kept in a predetermined state for a predetermined period of time after the beginning of the supply of the external power supply voltage; and a supply circuit for supplying the external power supply voltage to the control circuit;

wherein the control circuit puts output from the output circuit compulsorily into a high-impedance state.

13. The semiconductor device according to claim 12, further comprising an internal power supply voltage generating circuit for generating the internal power supply voltage from the external power supply voltage.

14. The semiconductor device according to claim 12, wherein the output circuit is a level converter and converts a signal at the internal power supply voltage level output from the processing circuit into a signal at the external power supply voltage level.

15. The semiconductor device according to claim 12, wherein the control circuit puts output from the output circuit compulsorily into an "L" state.

16. The semiconductor device according to claim 12, wherein the control circuit controls the output circuit according to a reset signal generated on the basis of the external power supply voltage.

17. The semiconductor device according to claim 16, wherein the control circuit controls the output circuit according to the reset signal only if the processing circuit is in a predetermined operation mode.

18. The semiconductor device according to claim 16, wherein the control circuit ignores the reset signal if the supply of the internal power supply voltage once stabilizes.

19. The semiconductor device according to claim 18, wherein even if the supply of the internal power supply voltage once stabilizes, the control circuit controls the state of output from the output circuit in the case of an internal reset signal being supplied.

20. The semiconductor device according to claim 12, wherein the control circuit controls the output circuit until the internal power supply voltage reaches a defined voltage.

21. The semiconductor device according to claim 12, wherein the control circuit controls the output circuit only if the processing circuit is in a predetermined operation mode.

22. The semiconductor device according to claim 12, wherein:

when the internal power supply voltage has not reached the defined voltage, the output circuit is controlled unconditionally; and when the internal power supply voltage has reached the defined voltage, the state of output from the output circuit is controlled only if the processing circuit is in a predetermined operation mode and a reset signal generated on the basis of the external power supply voltage is input.

* * * * *